R. WALKER.
Spoke-Socket.
No 58,030. Patented Sept. 11. 1866.
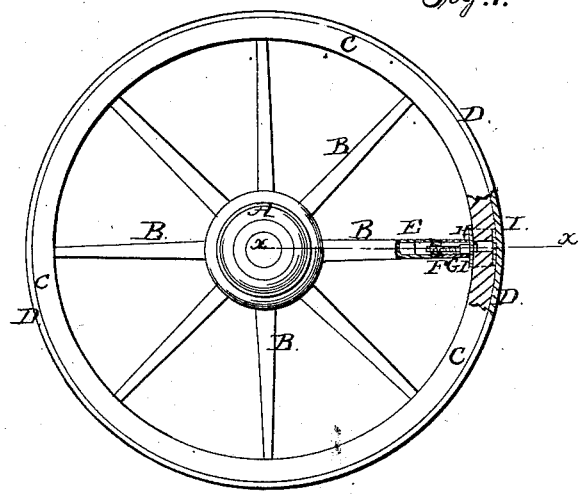
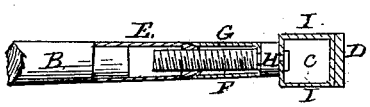
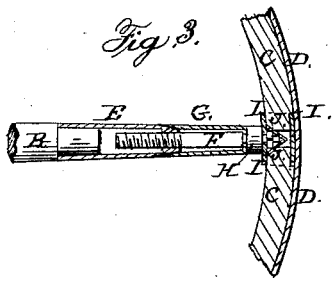
WITNESSES:
INVENTOR:

UNITED STATES PATENT OFFICE.

RICHARD WALKER, OF BATAVIA, NEW YORK, ASSIGNOR TO HIMSELF AND PETER BROADBOOKS, OF SAME PLACE.

IMPROVEMENT IN CARRIAGE-WHEELS.

Specification forming part of Letters Patent No. 58,030, dated September 11, 1866.

*To all whom it may concern:*

Be it known that I, RICHARD WALKER, of Batavia, Genesee county, State of New York, have invented a new and useful Improvement in Wheels for Vehicles; and I do hereby declare that the following is a full, clear, and exact description thereof, which will enable others skilled in the art to make and use the same, reference being had to the accompanying drawings, forming part of this specification, in which—

Figure 1 is a side view of a wheel with my improvement attached, a part being broken away to show the construction. Fig. 2 is a detail sectional view of the same, taken through the line $x\,x$, Fig. 1. Fig. 3 is a detail sectional view, illustrating a modification of my invention.

Similar letters of reference indicate like parts.

My invention has for its object to furnish a means by which the tire of a wheel may be tightened without resetting the tire; and it consists, first, in the combination of the ferrule, sleeve, nut, screw, and band with each other, and with spoke and fellies of the wheel, for the purpose of lengthening the spoke, thereby expanding the fellies and tightening the tire; second, in the combination of a wedge with the fellies, cap, and screw, for the purpose of filling the joint occasioned by the expansion of the fellies, the whole being constructed and arranged as hereinafter more fully described.

A is the hub, B the spokes, C the fellies, and D the tire of the wheel. One or more of the spokes are so placed as to be opposite the joints between the ends of two contiguous fellies. These spokes B are cut off, as shown in Figs. 1, 2, and 3.

Upon the shortened end of the spoke is fitted a ferrule, E, the lower end of which is made solid, and has a hole formed through it, in which is cut a screw-thread.

F is a screw which fits into the hole formed in the solid end of the ferrule E. G is a sleeve, the upper end of which fits over the lower end of the ferrule E, as shown in the drawings.

The lower end of the sleeve G is provided with an inwardly-projecting flange, which fits around a neck formed on the screw F, as shown, so that the screw may be turned without revolving the said sleeve G.

H is a nut firmly attached to the body of the screw F, or made solid therewith, by means of which the screw may be turned when necessary. The lower end or head of the screw is swiveled to the band or cap I, as shown in Figs. 1 and 2.

The band I is made in such a shape as to fit around the ends of the fellies C beneath the tire D, to cover and secure the joint between the ends of said fellies.

By turning the screw F out the spoke is thereby lengthened, and the ends of the fellies will be forced apart and the tire tightened, and by turning the said screw F in the spoke will be shortened and the tire loosened.

In the form represented in Fig. 3, the screw F, instead of being swiveled to the cap or band I, screws into a wedge-shaped nut, J, placed within the band I, which, by operating the screw F, is forced between the ends of the fellies C, thus filling the joint and holding all the parts of the wheel firmly.

I claim as new and desire to secure by Letters Patent—

1. The combination of the ferrule E, sleeve G, nut H, screw F, and band I with each other, and with the spoke B and fellies C, substantially as described, and for the purpose set forth.

2. The combination of the wedge or wedge-shaped nut J with the fellies C, cap or band I, and screw F, substantially as described, and for the purpose set forth.

RICHARD WALKER.

Witnesses:
H. M. WARREN,
PETER BROADBOOKS.